(12) United States Patent
Hessling-Von Heimendahl et al.

(10) Patent No.: US 10,941,864 B2
(45) Date of Patent: Mar. 9, 2021

(54) DRAIN VALVE, EXTERIOR AIRCRAFT LIGHT UNIT AND POWER SUPPLY BOX

(71) Applicant: Goodrich Lighting Systems GmbH, Lippstadt (DE)

(72) Inventors: Andre Hessling-Von Heimendahl, Koblenz (DE); Anil Kumar Jha, Lippstadt (DE); Sascha Lueder, Rietberg (DE); Ramesh Srinivasamurthy, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 483 days.

(21) Appl. No.: 15/983,130

(22) Filed: May 18, 2018

(65) Prior Publication Data
US 2018/0335150 A1    Nov. 22, 2018

(30) Foreign Application Priority Data

May 19, 2017    (EP) .................................... 17171905

(51) Int. Cl.
*F16K 1/32*     (2006.01)
*B64D 47/02*    (2006.01)
*F21S 45/30*    (2018.01)
*F21V 31/03*    (2006.01)
(Continued)

(52) U.S. Cl.
CPC ................ *F16K 1/32* (2013.01); *B64D 47/02* (2013.01); *F16K 15/023* (2013.01); *F16K 24/00* (2013.01); *F21S 45/30* (2018.01); *F21V 31/03* (2013.01); *B64D 2221/00* (2013.01)

(58) Field of Classification Search
CPC . F21S 45/30; F21S 45/33; F21S 45/37; F16K 15/028; F16K 17/04; F21V 31/03
See application file for complete search history.

(56) References Cited

U.S. PATENT DOCUMENTS

| 2,809,144 | A | 2/1989 | Suzuki |
| 4,809,144 | A | 2/1989 | Suzuki |
| 5,775,794 | A | 7/1998 | Schmitt |

(Continued)

FOREIGN PATENT DOCUMENTS

| AU | 7754075 A | 7/1976 |
| CN | 202203913 U | 4/2012 |

(Continued)

OTHER PUBLICATIONS

Extended European Search Report for International Application No. 17171905.7 dated Nov. 7, 2017, 7 pages.

*Primary Examiner* — Alexander K Garlen
(74) *Attorney, Agent, or Firm* — Cantor Colburn LLP

(57) ABSTRACT

A drain valve for draining liquid from an enclosed space comprises a movable plunger, which is movable between a closed position in which the plunger does not allow liquid to flow through the drain valve, and at least one open position, in which the plunger allows liquid to flow through the drain valve; and an elastic element, which is configured to urge the movable plunger into its closed position. The plunger is provided with at least one duct extending through the plunger and allowing fluid to flow through the drain valve when the plunger is positioned in its closed position, wherein said at least one duct is closed by a semi-permeable medium, which is permeable for air and water vapor and impermeable for liquid water.

20 Claims, 3 Drawing Sheets

(51) Int. Cl.
*F16K 15/02* (2006.01)
*F16K 24/00* (2006.01)

(56) References Cited

U.S. PATENT DOCUMENTS

| | | | |
|---|---|---|---|
| 6,071,000 A * | 6/2000 | Rapp | F21S 48/332 |
| | | | 362/362 |
| 6,210,014 B1 | 4/2001 | Kubizne et al. | |
| 6,709,493 B2 | 3/2004 | DeGuiseppi et al. | |
| 7,217,314 B2 | 5/2007 | DeGuiseppi et al. | |
| 7,927,405 B2 | 4/2011 | Bacino et al. | |
| 8,911,247 B2 | 12/2014 | Casas et al. | |
| 10,082,285 B2 * | 9/2018 | Hessling-Von Heimendahl | |
| | | | F21S 45/30 |
| 10,710,742 B2 * | 7/2020 | Hessling-Von Heimendahl | |
| | | | F21S 45/30 |
| 2005/0157514 A1 * | 7/2005 | Brinkmann | B60Q 1/0005 |
| | | | 362/547 |
| 2009/0268475 A1 * | 10/2009 | Ball | F21S 45/33 |
| | | | 362/373 |
| 2010/0068431 A1 | 3/2010 | Bansal et al. | |
| 2012/0048871 A1 | 3/2012 | Chiu | |
| 2013/0032115 A1 * | 2/2013 | Zitarosa | G05D 7/0133 |
| | | | 123/188.8 |
| 2015/0070927 A1 * | 3/2015 | Kurahashi | F21V 23/02 |
| | | | 362/546 |
| 2017/0363278 A1 * | 12/2017 | Furuuchi | F21S 45/20 |
| 2018/0106457 A1 * | 4/2018 | Jauernig | F21S 45/30 |
| 2019/0120456 A1 * | 4/2019 | Noda | F21V 31/00 |
| 2019/0271450 A1 * | 9/2019 | Dallos, Jr. | F21S 45/30 |

FOREIGN PATENT DOCUMENTS

EP     3168159 A1     5/2017
WO     2008105724 A1  9/2008

* cited by examiner

DRAIN VALVE, EXTERIOR AIRCRAFT LIGHT UNIT AND POWER SUPPLY BOX

FOREIGN PRIORITY

This application claims priority to European Patent Application No. 17171905.7 filed May 19, 2017, the entire contents of which is incorporated herein by reference.

TECHNICAL FIELD

The present invention relates to a drain valve, in particular to a drain valve which may be employed in an exterior aircraft light unit and/or in a power supply box for an exterior aircraft light unit. The invention further relates to an exterior aircraft light unit and a power supply box for an exterior aircraft light unit with such a drain valve.

BACKGROUND

Almost all aircraft are equipped with exterior aircraft light units. In particular, large passenger air planes are provided with a wide variety of exterior lights. Examples of such lights include navigation or position lights, beacon lights, anti-collision lights or strobe lights, wing lights, taxi lights, landing lights, runway turnoff lights, etc. All of these lights are respectively provided with at least one light source.

Since the air pressure varies with the height over sea level, exterior aircraft light units need to be vented during flight in order to avoid that an excessive under- and/or overpressure forms within the exterior aircraft light unit during the ascent or descent of the aircraft, respectively. Venting results in an exchange of air between the interior of the exterior aircraft light unit and the environment. Due to temperature differences, water vapor comprised in air flowing into the exterior aircraft light unit may condense within the exterior aircraft light unit. An excessive amount of water inside the light unit deteriorates its functionality.

It therefore would be beneficial to provide a drain valve which allows effective venting and draining of an exterior aircraft light unit.

SUMMARY

Exemplary embodiments of the invention include a drain valve for draining liquid, in particular water, from an enclosed space, such as the interior of an exterior aircraft light unit. According to an exemplary embodiment, the drain valve comprises a movable plunger, which is movable between a closed position and at least one open position, and an elastic element, which is configured to urge the movable plunger into its closed position. When positioned in its closed position, the plunger does not allow liquid to flow through the drain valve. When positioned in an open position, the plunger allows liquid to flow through the drain valve.

The plunger is provided with at least one duct extending through the plunger and allowing fluid to flow through the plunger and the drain valve when the plunger is positioned in its closed position. Said at least one duct is sealed by a semi-permeable medium, which is permeable for air and water vapor in case a predetermined pressure difference is exceeded, and which is impermeable for liquid water even if the predetermined pressure difference is exceeded. Thus, only air and water vapor, but no liquid water may flow through the duct and pass the drain valve when the plunger is positioned in its closed position.

Exemplary embodiments of the invention further include an exterior aircraft light unit comprising a housing which provides an enclosed space; at least one light source, which is arranged within the housing; a mounting portion, which is configured for mounting the housing to an aircraft; and a drain valve according to an exemplary embodiment of the invention. The drain valve is arranged at the housing in a flow path fluidly connecting the enclosed space with the outer environment and it is configured to alternately seal and vent the enclosed space.

Exemplary embodiments of the invention also include a power supply box, in particular a power supply box configured for supplying power to an aircraft light unit. The power supply box comprises a housing providing an enclosed space; and a drain valve according to an exemplary embodiment of the invention. The drain valve is arranged at the housing in a flow path fluidly connecting the enclosed space with the outer environment and it is configured to alternately seal and vent the enclosed space Exemplary embodiments of the invention also include a drain valve configured to allow liquid water to pass therethrough in one direction while preventing liquid water from passing therethrough in a second direction, the second direction being opposite to the first direction, while allowing air and water vapor to pass therethrough in both the first direction and in the second direction.

A drain valve according to an exemplary embodiment of the invention allows venting an enclosed space, in particular the enclosed space of an exterior aircraft light unit or of a power supply box, as air and water vapor may pass the semi-permeable membrane. The water blocking properties of the semi-permeable membrane, however, prevent liquid water from entering into the enclosed space. In case condensed liquid water collects within the enclosed space contacting the semi-permeable membrane, any flow through the semi-permeable membrane is blocked, i.e. even air and water vapor are not able to pass the semi-permeable membrane. When the semi-permeable membrane is blocked, an overpressure within the enclosed space moves the plunger into an open position allowing the liquid water to spill out of the enclosed space. As soon as the pressure has (nearly) equalized, the elastic element urges the plunger back into its closed position sealing the valve and preventing any liquid from entering the enclosed space.

As a result, a drain valve according to an exemplary embodiment of the invention provides a reliable and cost effective solution to the task of venting and draining an exterior light unit and/or a power supply box of an aircraft. A drain valve according to an exemplary embodiment of the invention in particular operates autonomously without a need for external control.

The expression of the drain valve being configured to alternately seal and vent the enclosed space means that the drain valve may seal the enclosed space from liquids, in particular from water entering or leaving the enclosed space at some points in time, while a liquid path between the enclosed space and the outside environment is provided at other points in time, namely when the plunger is in an open position. Alternately sealing and venting the enclosed space means that both the state of sealing and the state of venting/draining can be provided by the drain valve at different points in time.

The drain valve provides two paths between the enclosed space and the outside environment, namely a first path along the plunger, which is open or closed, depending on the position of the plunger, and a second path through the at least one duct and through the semi-permeable medium, which is open for air and water vapor, but closed for liquids, in particular water. In other words, the second path is closed for some kinds of fluids, such as water, while being open for other kinds of fluids, such as air and water vapor. As discussed above, the permeability for those other kinds of fluids may be compromised by water build-up at the semi-permeable medium in operation.

In an embodiment, the elastic element is a coil spring. A coil spring provides a reliable elastic element, which may be produced at low costs.

In an embodiment, the elastic element is an elastic support, in particular an elastic cover, supporting the plunger. Providing the elastic element as an elastic support, in particular as an elastic cover, allows for a very compact and efficient configuration of the drain valve.

In an embodiment, the drain valve comprises a sealing ring, in particular an O-ring, which is configured for sealing the drain valve when the plunger is arranged in its closed position. A sealing ring, in particular an O-ring, provides a very reliable and efficient sealing element at low costs.

In an embodiment, the semi-permeable medium is a semi-permeable membrane. The semi-permeable membrane in particular is attached to one face of the plunger. Providing the semi-permeable medium as a semi-permeable membrane provides a large semi-permeable surface using only a relatively small amount of material. The semi-permeable membrane in particular may be a GORETEX®-membrane, which is a very efficient and reliable semi-permeable membrane.

In an embodiment, the drain valve comprises a first housing portion and a second housing portion. The first and second housing portions may comprise matching threads, which allow to screw the first and second housing portions together for forming a housing of the drain valve. Such a configuration provides a housing which is easy to install and which provides easy access to the inside of the drain valve for maintenance and/or repair.

In an embodiment, the housing, in particular the portions of the housing, may be made from metal or plastic. Metal provides a very robust housing. A housing made of plastic may have a low weight and may be produced at low costs.

In an embodiment, the housing may have an attachment thread for screwing the drain valve into the housing of the exterior aircraft light unit or into the housing of the power supply box. The attachment thread may be an external thread coupleable to an internal thread of the housing of the exterior aircraft light unit or of the housing of the power supply box. The attachment thread may be standardized. This may allow using one kind of drain valves for various kinds of exterior aircraft light units and/or power supply boxes.

In an embodiment, the drain valve further comprises silica material, which in particular is arranged on the side of the plunger facing the enclosed space. Silica material absorbs moisture and thus helps to reduce the humidity within the enclosed space.

In an embodiment, the drain valve comprises a metallic material, in particular metal wool, which is arranged in the flow path between the enclosed space and the environment.

A metallic material, such as metal wool, in particular a material comprising a passivated and/or corrosion-resistant metal, is able to cool hot gases flowing through the drain valve. Such hot gases may be generated for example if, e.g. due to a malfunction, fuel flows into the enclosed space and is lighted by hot light sources. Cooling hot gases flowing out of the exterior aircraft light unit reduces the risk of lighting further fuel gases outside the light unit. As a result, the risk of a severe explosion caused by lighted fuel is considerably reduced.

In an embodiment, the drain valve comprises a stop or a restricting structure, which is configured for restricting the movement of the plunger into an open position. Said restricting structure is configured to restrict the movement of the plunger in particular in case a large force is acting on the plunger. Such large forces e.g. may be generated when fuel is lighted within the enclosed space. A restricting structure avoids an uncontrolled/unrestricted movement of the plunger and thus enhances the safety of the exterior aircraft light unit.

BRIEF DESCRIPTION OF THE DRAWINGS

Exemplary embodiments of the invention are described in greater detail below with reference to the enclosed figures.

DETAILED DESCRIPTION

Figure 1A:
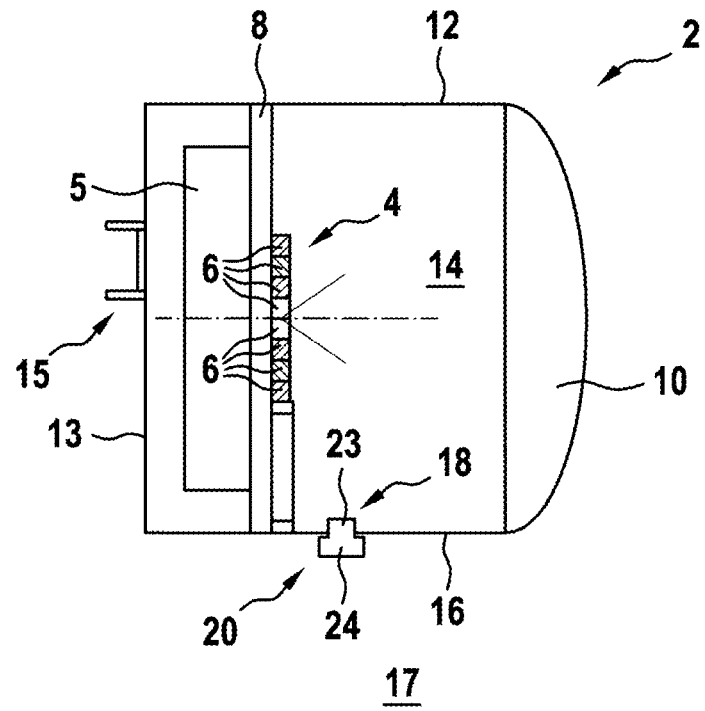
FIG. 1A depicts a schematic sectional view of an exterior aircraft light unit with a drain valve according to an exemplary embodiment of the invention.

FIG. 1A depicts a schematic sectional view of an exterior aircraft light unit 2 with a drain valve 20 according to an exemplary embodiment of the invention.

The exterior aircraft light unit 2 shown in FIG. 1A comprises a housing 12. At least one side of the housing 12 is provided as a transparent external cover 10. The transparent external cover 10 may be formed as a lens and thus may also be referred to as lens cover 10. A structural wall 8 supporting a light source 4 is arranged opposite to the transparent external cover 10, defining an enclosed space 14 between the transparent external cover 10 and the structural wall 8. An electric control circuit, which is configured for controlling the operation of the light source 4, is arranged on a rear side of the structural wall 8 facing away from the enclosed space 14. A rear side wall 13 of the housing 12 opposite to the transparent external cover 10 is formed as or provided with at least one mounting portion 15. The mounting portion 15 is configured for mounting the exterior aircraft light unit 2 to an aircraft (not shown), such as an airplane or helicopter. The exterior aircraft light unit 2 in particular may be mounted to the fuselage, to a wing or to a gear of the aircraft.

In the exemplary embodiment shown in FIG. 1A, the light source 4 is provided as a light source arrangement comprising a plurality of light emitting elements 6 arranged next to each other. In an alternative exemplary embodiment, which is not shown in the figures, the light source 4 may comprise only a single light emitting element 6.

The light emitting elements 6 may be arranged as a one-dimensional strip, as a two-dimensional array/matrix structure, or in any other pattern which is suitable for generating the desired light emission. The light emitting elements 6 may be embodied as LEDs, providing highly efficient light emitting elements 6. Depending on the function of the exterior aircraft light unit 2, the light emitting elements 6 may be configured for emitting light of the same color, or they may be configured for emitting light of different colors.

An opening 18 providing a flow passage between the enclosed space 14 and the outer environment 17 of the exterior aircraft light unit 2 is formed in a side wall 16 of the housing 12, extending between the transparent external cover 10 and the structural wall 8.

A drain valve 20 according to an exemplary embodiment of the invention is arranged within said opening 18. The drain valve 20 comprises a first portion 23, facing the enclosed space 14 formed within the housing 12, and a second portion 24, facing the outer environment 17 of the housing 12/exterior aircraft light unit 2.

The drain valve 20 is configured to allow gas, in particular air and water vapor, to flow into and out of the enclosed space 14 via the drain valve 20. This allows to compensate pressure differences between the enclosed space 14 and the outer environment 17.

The drain valve 20 is further configured to block liquid water from entering into the enclosed space 14 from the outer environment 17, but to allow liquid water, in particular condensed water which has formed within the enclosed space 14, to flow out of the enclosed space 14.

Although only a single opening 18 with a single drain valve 20 is shown in FIG. 1A, the skilled person will understand that a plurality of drain valves 20 may be provided in a plurality of openings 18 in order to increase the venting/draining capacity of the exterior aircraft light unit 2.

Figure 1B:
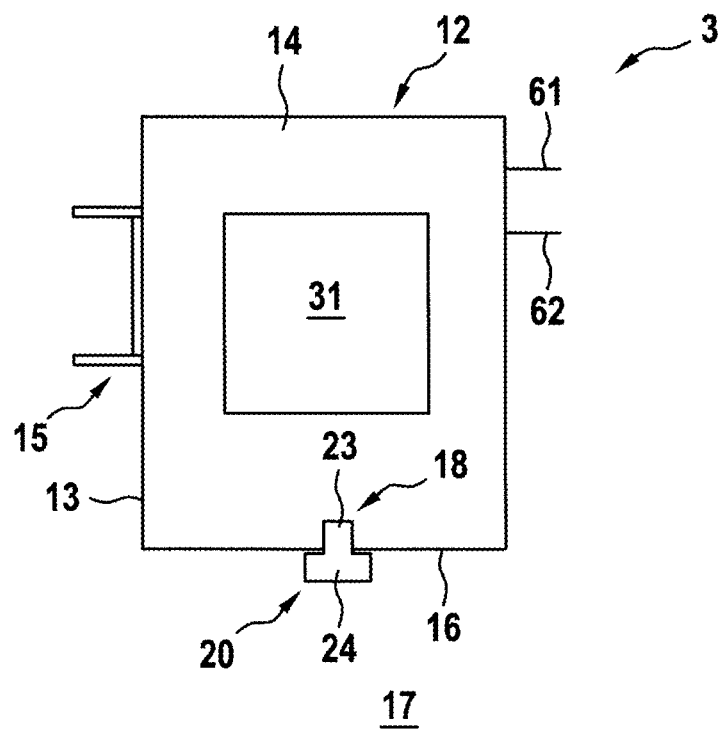
FIG. 1B depicts a schematic sectional view of a power supply box with a drain valve according to an exemplary embodiment of the invention.

FIG. 1B schematically depicts a power supply box 3 including a drain valve 20 according to an exemplary embodiment of the invention.

The power supply box 3 comprises a housing 12 accommodating at least one electric control circuit 31, which is configured for supplying electrical power to an exterior aircraft light unit 2, e.g. an exterior aircraft light unit 2 as depicted in FIG. 1A. The power supply box 3 has a power input 61, which is coupled to an aircraft on-board power supply network, when arranged in an aircraft, and a power output 62, which is coupled to and provides controlled power to an exterior aircraft light unit, when arranged in an aircraft.

At least one side 13 of the housing 12 is formed as or provided with at least one mounting portion 15, which is configured for mounting the power supply box 3 to the aircraft, such as an airplane or helicopter.

An opening 18, providing a flow passage between the enclosed space 14 and the outer environment 17 of the power supply box 3, is formed in a side wall 16 of the housing 12.

A drain valve 20 according to an exemplary embodiment of the invention is arranged within said opening 18. The drain valve 20 comprises a first portion 23, facing the enclosed space 14 formed within the housing 12, and a second portion 24, facing the outer environment 17 of the housing 12/power supply box 3.

The drain valve 20 is configured to allow air and water vapor to flow into and out of the enclosed space 14 via the drain valve 20 in order to allow for the compensation of pressure differences between the enclosed space 14 and the outer environment 17.

The drain valve 20 is further configured to block liquid water from entering into the enclosed space 14 from the outer environment 17, but to allow liquid water, in particular condensed water which has formed within the enclosed space 14, to flow out of the enclosed space 14.

Although only a single opening 18 with a single drain valve 20 is shown in FIG. 1B, the skilled person will understand that a plurality of drain valves 20 may be provided in a plurality of openings 18 in order to increase the venting/draining capacity.

In the following, exemplary embodiments of the drain valve 20 will be discussed in more detail with reference to FIGS. 2 to 5.

Figure 2:
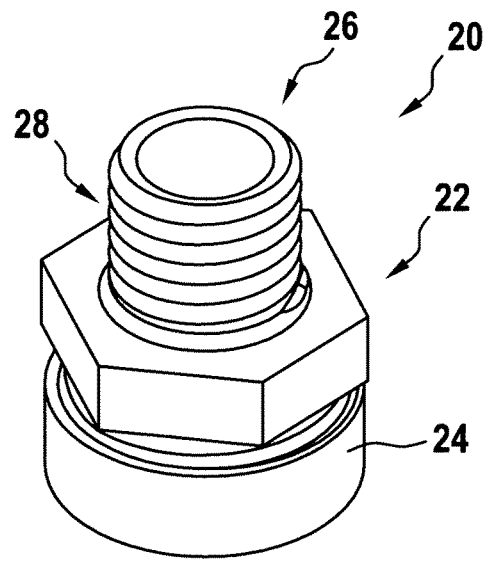
FIG. 2 depicts a perspective view of a drain valve according to an exemplary embodiment of the invention.
Figure 3:
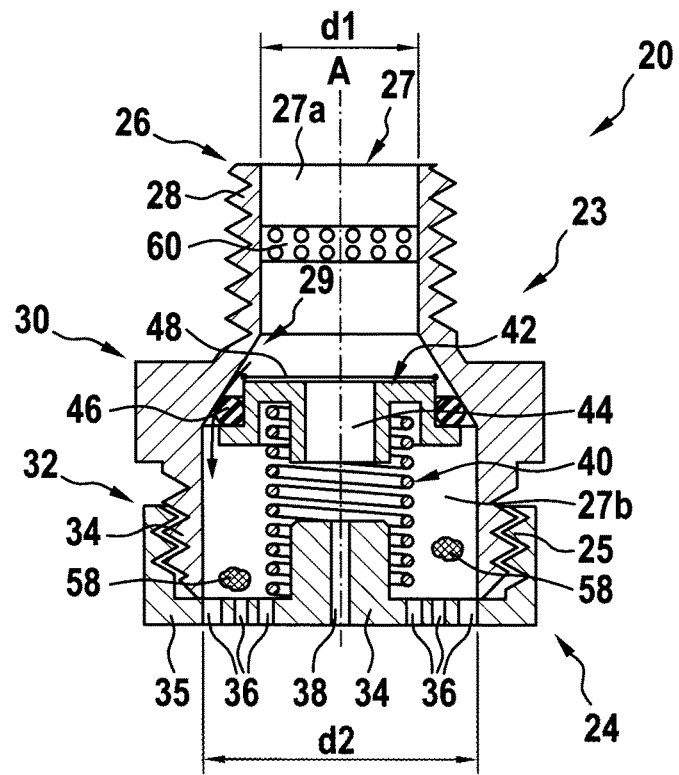
FIG. 3 shows a cross-sectional view of the drain valve depicted in FIG. 2.

FIG. 2 depicts a perspective view of a drain valve 20 according to an exemplary embodiment of the invention, and FIG. 3 shows a cross-sectional view thereof.

The drain valve 20 shown in FIGS. 2 and 3 comprises a housing 22 including a first housing portion 23, which is shown in the upper parts of FIGS. 2 and 3, and a second housing portion 24, which is depicted in the lower parts of FIGS. 2 and 3.

When the drain valve 20 is installed within the housing 12 of the exterior aircraft light unit 2, the first portion 23 is facing the enclosed space 14 of the exterior aircraft light unit 2 and the second portion 24 is facing towards the outer environment 17 of the exterior aircraft light unit 2 (cf. FIG. 1A).

The first portion 23 of the housing 22 comprises a first part 26, which is shown in the upper parts of FIGS. 2 and 3, and a second part 32, which is depicted in the lower parts of FIGS. 2 and 3.

When the drain valve 20 is installed within the housing 12 of the exterior aircraft light unit 2, the first part 26 is facing the enclosed space 14 of the exterior aircraft light unit 2, and is therefore in the following is called the "inner part" 26, while the second part 32 is facing to the outer environment 17 of the exterior aircraft light unit 2, and is therefore in the following called the "outer part" 32 of the first portion 23. A third part 30 of the first portion 23, which is arranged between the first and second parts 26, 32, is called the "intermediate part" 30.

The inner part 26 and the outer part 32 are formed cylindrically around a common central axis A, respectively.

The inner part 26 is provided with an outer thread 28, which allows to screw the inner part 26 into a matching inner thread (not shown) formed within the opening 18 of the housing 12 of the exterior aircraft light unit 2, in order to securely attach the drain valve 20 to the light unit 2.

The outer periphery of the intermediate part 30 has the form of a hexagon screw. This allows screwing the upper portion 23 conveniently into the side wall 16 of the exterior aircraft light unit 2, using a conventional wrench.

The outer part 32 is provided with an outer thread 34, and the second portion 24 of the housing 20 is provided with a matching inner thread 25. The matching threads 25, 34 allow screwing the first and second portions 23, 24 together for forming the housing 22, as it is shown in FIGS. 2 and 3.

The first portion 23 is provided with an inner bore 27 extending along the central axis A. In the inner part 26, the bore 27 has a first diameter d1. In the outer part 32, the bore 27 has a second diameter d2, which is larger than the first diameter d1 (d2>d1). In the intermediate part 30, the bore 27 is tapered, widening from the first diameter d1 to the second diameter d2.

The second portion 24 comprises a bottom plate 35 closing the outer opening of the bore 27, when the first and second portions 23, 24 of the housing 22 are screwed together, as it is shown in FIGS. 2 and 3. A plurality of openings 36, 28 are formed in the bottom plate 35, providing a plurality of flow paths between the bore 27 and the outer environment 17.

A central opening 38, extending along the central axis A, is formed in a central part of the bottom plate 35. A cylindrical protrusion 34, surrounding the central opening 38, extends from the bottom plate 35 towards the first portion 23.

A cylindrical spring 40, which extends coaxially with the axis A, is mounted to said protrusion 34. At its opposite end facing away from the bottom plate 35, the cylindrical spring 40 elastically supports a movable plunger 42. The movable plunger 42 is movable along the axis A against the elastic force of the cylindrical spring 40.

The plunger 42 has rotational symmetry with respect to the axis A and comprises a central bore or duct 44, extending along said axis A. A sealing ring 46, in particular an O-ring 46, is arranged along the circular outer periphery of the plunger 42.

In an idle state, i.e. in a state in which no external force is acting on the plunger 42, the cylindrical spring 40 urges the plunger 42 towards the inner part 26 of the first portion 23 of the housing 22, pressing the sealing ring 46 against the tapered portion 29 of the bore 27. As a result, the sealing ring 46 seals the interface between the plunger 42 and the inner wall of the tapered portion 29 of the bore 27, so that no fluid is able to pass between the outer periphery of the plunger 42 and the inner wall of the bore 27.

A semi-permeable medium/membrane 48, in particular a GORETEX®-membrane, is attached to the side of the plunger 42 facing the inner part 26 of the first portion 23. The semi-permeable membrane 48 in particular covers and seals the central duct 44 formed within the plunger 42. The semi-permeable membrane 48 may be glued to the plunger 42, or it may be fixed to the plunger by other appropriate fixing means.

In case a pressure difference between the two sides of the semi-permeable membrane 48 exceeds a predetermined threshold, the semi-permeable membrane 48 is permeable for air and water vapor, but it is not permeable for liquids, in particular liquid water.

In consequence, in case there is a pressure difference between the portion 27a of the bore 27 formed within the inner part 26 of the first portion 23, which is fluidly connected with the enclosed space 14 of the exterior aircraft light unit 2 (cf. FIG. 1A), and the portion 27b of the bore 27 formed within the outer part 32 of the first portion 23, air and water vapor may pass through the semi-permeable membrane 48 and flow through the central duct 44 formed within the plunger 42 and the central opening 38 (and the additional openings 36) formed within the bottom plate 35 of the second portion 24 of the housing 22, or in the opposite direction, in order to compensate for said pressure difference.

Liquid water, however, is not able to pass the semi-permeable membrane 48. Thus, liquid water cannot enter from the exterior into the enclosed space 14 of the exterior aircraft light unit 2 via the drain valve 20.

If liquid water, in particular condensed water formed within the enclosed space 14 of the exterior aircraft light unit 2, collects on the semi-permeable membrane 48, said liquid water blocks the semi-permeable membrane 48, and the semi-permeable membrane 48 becomes non-permeable to air and water vapor as well.

In this case, a sufficient increase of the pressure within the portion 27a of the bore 27 formed within the inner part 26 of the first portion 23, which is fluidly connected with the enclosed space 14 of the exterior aircraft light unit 2 (cf. FIG. 1A), causes the plunger 42 to move towards the bottom plate 35 compressing the cylindrical spring 40.

This movement of the plunger 42 creates a gap between the sealing ring 46 and the tapered wall portion 29 of the bore 27. Liquid water collected on the plunger 42 will flow through said gap from the inner part 26 through the intermediate part 30 into the outer part 32 and exit the drain valve 20 via the openings 36 formed in the bottom plate 35.

After the liquid water has been drained and the pressure within the upper portion 26 has been reduced, the elastic force of the cylindrical spring 40 forces the plunger 42 back into its closed position. When the plunger 42 is in its closed position, the sealing ring 46 abuts against the tapered wall portion 29, sealing the drain valve 20 and allowing only air and water vapor to pass the drain valve 20 via the semi-permeable membrane 48, as it has been described before.

A metal material 58, in particular metal wool, comprising a passivated and/or corrosion-resistant metal, may be provided in the bore 27. The metal material 58 in particular may be provided in the portion 27b of the bore 27 formed within the outer part 32 of the first portion 23. Said metal material 58 is configured for cooling hot gases flowing through the drain valve 20. Such hot gases may be generated for example when, e.g. due to a malfunction, fuel enters into the enclosed space 14 and is lighted there by the hot light sources 6. Cooling the hot gases flowing/blowing out of the exterior aircraft light unit 2 reduces the risk of lighting even more fuel gases, which may be present outside the light unit 2. As a result, the risk of a severe explosion of fuel gases is considerably reduced.

A silica material 60 may be arranged on the side of the plunger 42 facing the enclosed space 14. Silica material absorbs moisture and thus helps to reduce the humidity within the enclosed space 14. Additionally or alternatively, silica material 60 may be arranged within the enclosed space 14 outside the drain valve 20.

Figure 4:
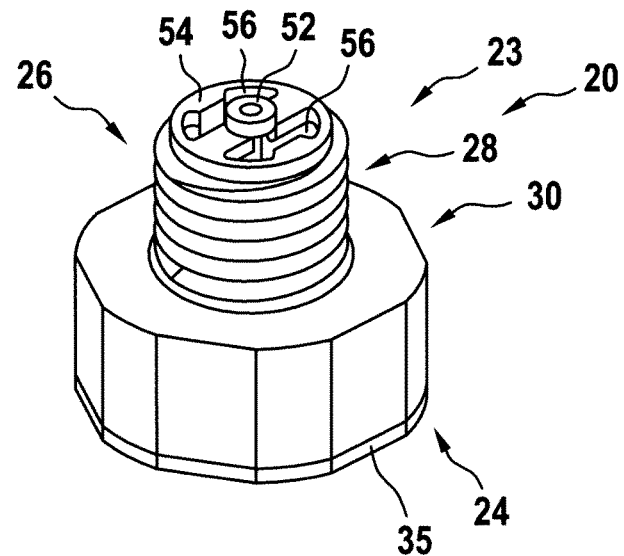
FIG. 4 depicts a perspective view of a drain valve according to another exemplary embodiment of the invention.
Figure 5:
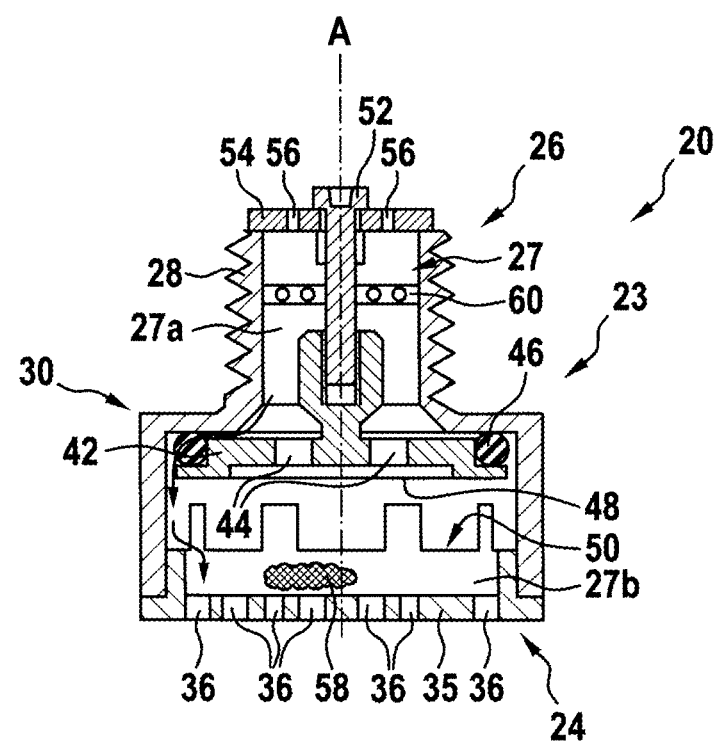
FIG. 5 shows a cross-sectional view of the drain valve depicted in FIG. 4.

FIGS. 4 and 5 illustrate a drain valve 20 according to another exemplary embodiment of the invention.

FIG. 4 shows a perspective view of the drain valve 20 and FIG. 5 shows a cross-sectional view thereof.

The elements of the drain valve 20 which correspond with the elements of the exemplary embodiment shown in FIGS. 2 and 3 are denoted with the same reference signs and will not be discussed in detail again.

In the exemplary embodiment shown in FIGS. 4 and 5, the first portion 23 of the housing 22 comprises a first (inner) cylindrical part 26 and a second (outer) cylindrical part 32, which has a larger diameter than the first part 26. The inner and outer cylindrical parts 26, 32 are formed coaxially with respect to a common axis A. An intermediate part 30 extends between the inner and outer cylindrical parts 26, 32 in a direction which is basically orthogonal to the axis A.

The second portion 24 of the housing has the form of a bottom plate 35, which is attached to the front side of the first portion 23 shown at the bottom of FIGS. 4 and 5. The first and second portions 23, 24 of the housing 22 may be attached to each other by gluing, press-fitting, welding or a similar suitable attaching method.

The plunger 42 is supported by a pin 52 extending along the axis A through the inner part 26 of the first portion 23. The plunger 42 is fixed, e.g. screwed, glued or welded, to one end of the pin 52. Alternatively, it may be formed integrally with the pin 52.

An opposing end of the pin 52 is supported on the inner part 26 of the first portion 23 by an elastic element 54, in particular an elastic cap 54, which is arranged at the upper side of the inner part 26.

The cap 54 is provided with openings 56 allowing fluid to pass through the cap 54.

The elastic element/cap 54 may deform elastically allowing the pin 52 and the plunger 42, which is attached to said pin 52, to move along the axis A.

In an idle state, i.e. when no external force is acting on the plunger 42, the elastic element 54 urges the pin 52 and the plunger 42 into a closed position, in which it closes the gap between the plunger 42 and the intermediate portion 30 of the housing 22, as it is illustrated in FIGS. 4 and 5. The closed gap is sealed by a sealing ring 46, in particular an O-ring, which is arranged along the outer periphery of the plunger 42.

In the exemplary embodiment shown in FIGS. 4 and 5, two bores 44 are formed in the plunger 42 fluidly connecting the two sides of the plunger 42 facing the first and second portions 23, 24 of the housing 22, respectively. The skilled person will understand that the number and the size of the bores 44 is only exemplary and may be adjusted to the respective needs.

A semi-permeable membrane 48, sealing the bores 44, is attached to the plunger 42, in particular to the side of the plunger 42 facing the second portion 24 of the housing 22. The skilled person, however, will understand that the semi-permeable membrane 48 also may be attached to the other side of the plunger 42 facing the first portion 23 of the housing 22.

The functionality of the semi-permeable membrane 48 is identical with the functionality of the semi-permeable membrane 48 in the exemplary embodiment shown in FIGS. 2 and 3. I.e., the semi-permeable membrane 48 is non-permeable to liquid water, but permeable to air and water vapor (in case a predetermined pressure difference is exceeded) so that air and water vapor may pass the semi-permeable membrane 48 for pressure compensation.

However, in case liquid water, in particular condensed water, collects on the semi-permeable membrane 48, the flow path through the semi-permeable membrane 48 is blocked. In consequence, the semi-permeable membrane 48 becomes impermeable to air and water vapor as well As a result, an overpressure in the portion 27a of the bore 27 formed within the inner part 26 of the first portion 23, which is fluidly connected with the enclosed space 14 of the exterior aircraft light unit 2 (cf. FIG. 1A), urges the plunger 42 towards the second portion 24, creating a gap between the sealing ring 46 and the intermediate portion 30 of the housing 22. Said gap allows liquid water collected on the semi-permeable membrane 48 to pass through said gap and to flow out of the drain valve 20 via the openings 36 formed in the bottom plate 35 of the second portion 24.

When the pressure difference between the interior space within the inner part 26 and the exterior has (nearly) equalized and no opening force is acting onto the plunger 42 anymore, the elastic force of the elastic cap 54 forces the pin 52 and the plunger 42 back into the closed position shown in FIG. 5, in which the sealing ring 46 is pressed against the intermediate portion 30 of the housing 22, sealing the drain valve 20.

A metal material 58, in particular metal wool, comprising a passivated and/or corrosion-resistant metal, may be provided in the bore 27. The metal material 58 in particular may be provided in the portion 27b of the bore 27 formed within the outer part 32 of the first portion 23. Said metal material 58 is configured for cooling hot gases flowing through the drain valve 20. Such hot gases may be generated e.g. when, due to a malfunction, fuel enters into the enclosed space 14 and is lighted there by the hot light sources 6. Cooling the hot gases flowing/blowing out of the exterior aircraft light unit 2 reduces the risk of lighting even more fuel gases, which may be present outside the light unit 2. As a result, the risk of a severe explosion of fuel gases is considerably reduced.

A restricting structure 50 may be formed within the second portion 24 of the housing 22, in particular at the inner wall of the second portion 24. Said restricting structure 50 is configured to restrict the movement of the plunger 42 towards the bottom plate 35. It in particular avoids that the plunger 42 hits the bottom plate 35 even in case a large force is acting on the plunger 42. Such large forces e.g. may be generated when fuels are lighted within the enclosed space 14.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

What is claimed is:

1. An exterior aircraft light unit comprising:
   a housing providing an enclosed space;
   at least one light source arranged within the housing;
   a mounting portion configured for mounting the housing to an aircraft; and
   a drain valve that includes:
      a plunger, which is movable between a closed position in which the plunger does not allow liquid to flow through the drain valve, and at least one open position, in which the plunger allows liquid to flow through the drain valve; and
      an elastic element, which is configured to urge the movable plunger into its closed position;
      wherein the plunger is provided with at least one duct extending through the plunger and allowing fluid to flow through the drain valve when the plunger is positioned in its closed position, and wherein said at least one duct is closed by a semi-permeable medium, which is permeable for air and water vapor and impermeable for liquid water;
   wherein the drain valve is arranged at the housing in a flow path fluidly connecting the enclosed space with the outer environment and is configured to alternately seal and vent the enclosed space.

2. An exterior aircraft light unit according to claim 1, wherein the exterior aircraft light unit is at least one of: a position light unit, a beacon light unit; an anti-collision light unit; a strobe light unit, a wing light unit; a landing light unit, an awareness light unit; a runway turn-off light unit, a take-off light unit; a taxi light unit; and a multi-functional light unit, and the exterior aircraft light unit provides at least two of the functionalities of: a position light unit; a beacon light unit; an anti-collision light unit; a strobe light unit; a wing light unit, a landing light unit; an awareness light unit; a runway turn-off light unit; a take-off light unit; and a taxi light unit.

3. The exterior aircraft light unit according to claim 1, wherein the elastic element is a coil spring.

4. The exterior aircraft light unit according to claim 1, wherein the elastic element is an elastic support, in particular an elastic cover, supporting the plunger.

5. The exterior aircraft light unit according to claim 1, the drain valve further comprising a sealing ring, in particular an O-ring, which is configured for sealing the drain valve when the plunger is arranged in its closed position.

6. The exterior aircraft light unit according to claim 1, wherein the semi-permeable medium is attached to one face of the plunger.

7. The exterior aircraft light unit according to claim 1, the drain valve comprising a first housing portion and a second housing portion, wherein the first and second housing portions in particular comprise matching threads which allow screwing the first and second housing portions together for forming a housing of the drain valve.

8. The exterior aircraft light unit according to claim 1, the drain valve further comprising: a housing which is made from metal or plastic.

9. The exterior aircraft light unit according to claim 1, the drain valve further comprising at least one of: silica material and metal wool.

10. The exterior aircraft light unit according to claim 1, the drain valve further comprising: a restricting structure which is configured for restricting the movement of the plunger when moving into an open position.

11. A power supply box for supplying power to an aircraft light unit, wherein the power supply box comprises:
a housing providing an enclosed space; and
a drain valve arranged at the housing in a flow path fluidly connecting the enclosed space with the outer environment which is configured to alternately seal and vent the enclosed space, the drain valve including:
a plunger, which is movable between a closed position in which the plunger does not allow liquid to flow through the drain valve, and at least one open position, in which the plunger allows liquid to flow through the drain valve; and
an elastic element, which is configured to urge the movable plunger into its closed position;
wherein the plunger is provided with at least one duct extending through the plunger and allowing fluid to flow through the drain valve when the plunger is positioned in its closed position, and wherein said at least one duct is closed by a semi-permeable medium, which is permeable for air and water vapor and impermeable for liquid water.

12. The power supply box of claim 11, further including: a mounting portion, configured for mounting the power supply box to an aircraft.

13. The power supply box of claim 11, wherein the elastic element is a coil spring.

14. The power supply box of claim 11, wherein the elastic element is an elastic support, in particular an elastic cover, supporting the plunger.

15. The power supply box of claim 11, the drain valve further comprising a sealing ring, in particular an O-ring, which is configured for sealing the drain valve when the plunger is arranged in its closed position.

16. The power supply box of claim 11, wherein the semi-permeable medium is attached to one face of the plunger.

17. The power supply box of claim 11, the drain valve comprising a first housing portion and a second housing portion, wherein the first and second housing portions in particular comprise matching threads which allow screwing the first and second housing portions together for forming a housing of the drain valve.

18. The power supply box of claim 11, the drain valve further comprising: a housing which is made from metal or plastic.

19. The power supply box of claim 11, the drain valve further comprising at least one of: silica material and metal wool.

20. The power supply box of claim 11, the drain valve further comprising: a restricting structure which is configured for restricting the movement of the plunger when moving into an open position.

* * * * *